UNITED STATES PATENT OFFICE.

THOMAS FRANCIS TIERNEY, OF WATERTOWN, MASSACHUSETTS, ASSIGNOR TO ECONOMY FOOD PRODUCTS COMPANY, OF CAMBRIDGE, MASSACHUSETTS, A CORPORATION OF MASSACHUSETTS.

METHOD OF MAKING SHORTENED FOOD PRODUCTS.

1,167,133.     Specification of Letters Patent.     Patented Jan. 4, 1916.

No Drawing.     Application filed April 7, 1914. Serial No. 830,282.

*To all whom it may concern:*

Be it known that I, THOMAS F. TIERNEY, a citizen of the United States, residing at Watertown, county of Middlesex, Commonwealth of Massachusetts, have invented certain new and useful Improvements in Methods of Making Shortened Food Products, of which the following is a specification.

This invention relates to food products and particularly to shortened food products and the method of making the same. The particular class of products to which my invention especially applies is that in which the material produced is in a dry or powdered form.

Of the many articles adapted for dietetic use, it is extremely desirable, if not necessary, to have many of them in a dry and pulverized form so that they may be packed and handled conveniently and under conditions which with the ingredients in their usual state would render such handling impossible or at least not commercially possible. This is true of many lines generally but particularly true in the instance of such a material as a doughnut preparation which for the purposes of illustration I shall particularly discuss in my present application.

In producing such an article of food as a doughnut it is of great importance for successful culinary to have the ingredients properly and scientifically mixed and is of course of great convenience to have them ready prepared and in a form which may be readily used even by one who is comparatively unskilled or inexperienced in the production of that particular product. In such a product as the doughnut or cruller it is particularly important that the ingredients be properly combined and especially that they be so mechanically blended as to produce a satisfactory article.

The introduction of the shortening element in such a production is a matter of mechanical difficulty requiring skilful manipulation, and the shortened product has by reason of its very nature been something which has been considered to be incapable of commercial distribution. The greasy or oily nature of lard, butter or other shortening elements has prevented the preparation of ready shortened products especially in dry or pulverized form.

It is the object of my present invention to provide a ready prepared and shortened product capable of being reduced to a state ready for cookery by merely mixing with water.

As stated above, my present invention will be discussed with particular reference to a doughnut or cruller preparation although of course it would be understood that it may equally as well apply to other articles in which shortening is a necessary element.

I have already suggested that one of the great difficulties has been the handling of a greasy or oily shortening in combination with other elements and of suitably mixing the shortening through the product to secure a uniform distribution. In the practice of my invention I secure both of these desired results so that the product is not only capable of commercial production and handling but is superior in the matter of its blending or assemblage over the usual hand methods of mixing in which the free shortening is introduced during the process of building up the mixture.

In preparing a commercial doughnut mixture in a dry or pulverized form, I practise my invention in substantially the following manner. Flour of the desired nature is first sterilized and mixed with the proper proportions of cream of tartar, soda, spice and salt. To this is added the proper amount (according to the richness desired) of egg in powdered form and for this purpose any of the egg products may be used but preferably the dry desiccated eggs now on the market. I also use the desired amount (which is proportioned to the dry mixture before mentioned) of milk in powdered form and produced in any of the well known manners now practised. In adding the shortening element, I find that by taking about two and one-fourth pounds of lard to about twenty-five pounds of powdered sugar and beating the lard into the sugar I am able to produce a shortening mixture in a perfectly dry and pulverized form.

It is difficult to state with absolute accuracy the exact microscopic transformation which takes place during the process. There appears to be a mechanical separation of the lard into minute particles, each completely surrounded with the dry, powdered sugar, or even penetrated by the sugar. There also appears upon a microscopic examination to be a state of physical union, which is somewhat similar to this, but in which the particles of sugar, being slightly more in predominance, might be said to have the lard on its surface as a coating, or filled to a certain degree by penetration. Furthermore, viewed microscopically, certain minute particles of sugar, which might or might not, according to the degree of perfection of the mixture, have a film or coating, or the impregnation last mentioned, might be so associated as to have a considerable percentage of void between their noncontacting portions, and there may be minute particles of lard within such voids. This forms a mass leaving the lard distributed in a finely divided state and held in such state by the powdered sugar.

In this state the lard may be mixed with the other dry elements of the product by a mere mechanical mixing which can be done very completely and uniformly with the resultant product uniformly shortened and while still in an absolutely dry and pulverized state. Upon the addition of water to this product the sugar which in itself is required as a sweetening dissolves, leaving the lard uniformly distributed throughout the mass in tiny particles which are more minute than can be possibly produced by any mixing of the lard whether it had been introduced in fluid state or rubbed in as an unctuous or oily substance.

The product produced in the above manner furnishes the entire element for the doughnut with the exception of the water, and the dough thus formed has then only to be rolled out, cut and fried in the usual manner. It is impossible to describe all of the articles to which my invention may apply. In each case the ingredients are introduced in their proper proportions and the shortening introduced in the manner hereinbefore described. The order of assembling the elements and the variations of the elements to produce different articles of cookery may all be varied without departing from the spirit of my invention if within the terms of the appended claims.

What I therefore claim and desire to secure by Letters Patent is:

1. As an article of manufacture, a dry mixture consisting of a cereal, leaven and seasoning, including a dry shortening element consisting of comminuted fatty matter in an intimate mixture with an amount of dry, soluble, edible matter sufficient to eliminate the greasy characteristic in the mixture.

2. The method of producing a doughnut mixture consisting in mechanically manipulating an oily or fatty shortening matter with an amount of powdered sugar sufficient to reduce it to minute particles isolated in said powdered sugar, and in dry mixing the elements so produced with suitable proportions of flour, leaven and shortening to produce a dry pulverized product.

3. As an article of manufacture, a dry mixture consisting of a cereal including a dry shortening element consisting of comminuted fatty matter in an intimate mixture with an amount of dry, soluble, edible matter sufficient to eliminate the greasy characteristic in the mixture.

4. The method of producing a product of the class described, consisting in mechanically manipulating an oily or fatty shortening matter with an amount of edible matter in finely pulverized form to reduce it to minute particles, isolated in said pulverized matter, and in dry mixing the elements so produced with suitable proportions of other food elements to produce a pulverized product.

5. A method of producing a shortening element consisting in mechanically manipulating an oily or fatty shortening with an amount of dry, soluble, edible matter to reduce it to minute particles in intimate relation with the soluble matter.

In testimony whereof I affix my signature in presence of two witnesses.

THOMAS FRANCIS TIERNEY.

Witnesses:
MARION C. HOBBS,
VICTORIA LOWDEN.